(12) United States Patent
Surgutchik et al.

(10) Patent No.: US 7,716,506 B1
(45) Date of Patent: May 11, 2010

(54) APPARATUS, METHOD, AND SYSTEM FOR DYNAMICALLY SELECTING POWER DOWN LEVEL

(75) Inventors: Roman Surgutchik, Santa Clara, CA (US); Robert William Chapman, Mountain View, CA (US); Edward L. Riegelsberger, Fremont, CA (US); Brad W. Simeral, San Francisco, CA (US); Paul J. Gyugyi, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 662 days.

(21) Appl. No.: 11/611,118

(22) Filed: Dec. 14, 2006

(51) Int. Cl.
*G06F 1/26* (2006.01)
(52) U.S. Cl. .................. 713/321; 713/323; 713/324
(58) Field of Classification Search .............. 713/323, 713/324, 321
See application file for complete search history.

(56) References Cited

U.S. PATENT DOCUMENTS

| | | | |
|---|---|---|---|
| 6,775,784 B1 * | 8/2004 | Park | 713/320 |
| 7,117,380 B2 * | 10/2006 | Kangas | 713/320 |
| 7,571,335 B2 * | 8/2009 | Lee | 713/330 |
| 2004/0128576 A1 * | 7/2004 | Gutman et al. | 713/323 |

OTHER PUBLICATIONS

Evers, Maris, Low Power AMD Athlon™ 64 and AMD Opteron™ Processors, Hot Chips 2004, pp. 1-15.

* cited by examiner

*Primary Examiner*—Thuan N Du
(74) *Attorney, Agent, or Firm*—Cooley Godward Kronish LLP

(57) ABSTRACT

A system has a plurality of different clients. Each client generates a report signal indicative of a current latency tolerance associated with a performance state. A controller dynamically determines a power down level having a minimum power consumption capable of supporting the system latency of the configuration state of the clients.

20 Claims, 4 Drawing Sheets

APPARATUS, METHOD, AND SYSTEM FOR DYNAMICALLY SELECTING POWER DOWN LEVEL

FIELD OF THE INVENTION

The present invention is general related to techniques for implementing a power savings mode in which one or more units are placed in a power down level.

BACKGROUND OF THE INVENTION

Many electronic systems have low power states, sometimes known as "sleep" states or "off states" although more generally there is now a spectrum of power down levels with reduced power level in addition to a "normal" operating state. For example, modern computer systems and graphics systems typically place different units and interfaces into a low power down state when specific units and interfaces are idle. For example, a microprocessor may have power states C0-C3, where C0 is the operating state, C1 is a halt state, C2 is stop-clock state, and C3 is sleep state. Some microprocessors also have deep sleep (C4) and/or deeper sleep states that differ in how long it takes to wake up the processor. Some buses, such as the HyperTransport (HT) bus facilitate power management such that changes in processor state can signal changes to a lower power HT device state. As other examples, the voltage of a memory controller can be reduced when idle, PHY interfaces may have different power down levels, and phase locked loops can be turned off when in idle states.

As examples of power down states, a voltage of an integrated circuit, such as a central processing unit or memory controller, may be placed into low-voltage state as an ultra low power state for an idle condition. As one example, some AMD based processors support a low power mode in which a CPU clock or voltage can be ramped down to save power. Additionally, an Alternate Voltage ID (AltVID) option in some AMD microprocessors permits chip voltage to be ramped down further after the clocks have ramped down. The AltVID option includes a programmable code sent to a voltage regulator to reduce microprocessor voltage to a minimum operational level for additional power savings. PHY network interfaces may have a low power state for an idle condition. Additionally, in some systems portions of the clock tree feeding idle units, such as phase locked loops, may be turned off in an idle state. Thus, in light of recent advances in power savings technology, systems designers often have two or more possible choices for a power down state that correspond to a sleep state and at least one "deeper sleep" state. That is, in designing an electronic system, a designer chooses one of two or more low power states ("power down") levels as the default power down state that the system enters for an idle condition. However, each power down level also has an associated exit latency to transition to a normal mode of operation when the system is fully functional. The deeper power down levels have better power savings but also have higher exit latencies, i.e., require a longer time to wake up. Conventionally, a deep power down state, such as one using AltVID, cannot be used if the system includes units having a latency tolerance less than the exit latency of the deep power down state. Conventionally a system designer would select a default power down state based on a worst case latency tolerance.

However, in many systems there are may be a variety of units with different latency tolerances. For example, a graphics system may have an integrated circuit designed to perform many different functions. For example, the Media and Communications Processors (MCPs) developed by the Nvidia Corporation of Santa Clara, Calif. replaces a conventional Southbridge chip and supports integrated networking and communications functions such as supporting Ethernet ports, universal serial bus (USB) ports, audio processing, and Dolby digital encoding. Each of these different functions has a corresponding unit with a latency tolerance. Conventionally, it is desirable to increase the number of different integrated networking and communications functions in an MCP chip to increase the number of available functions. However, this makes it difficult using conventional design approaches to utilize deeper power down levels using the conventional design approach.

Therefore, in light of the problems described above, the apparatus, method, and system of the present invention was developed.

SUMMARY OF THE INVENTION

Electronic systems often include power down levels that utilize less power than a normal operational mode. The depth of the power down levels affects exit latency. Electronic systems are conventionally designed to utilize a power down level consistent with a worst case latency. In accordance with one aspect of the present invention, the power down level for a system is dynamically selected based on the actual current latency tolerances of different active clients. One embodiment of a method of managing power down levels includes monitoring latency tolerances of a plurality of clients associated with client performance states. A minimum power down level capable of supporting a system latency associated with the plurality of clients is dynamically selected.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
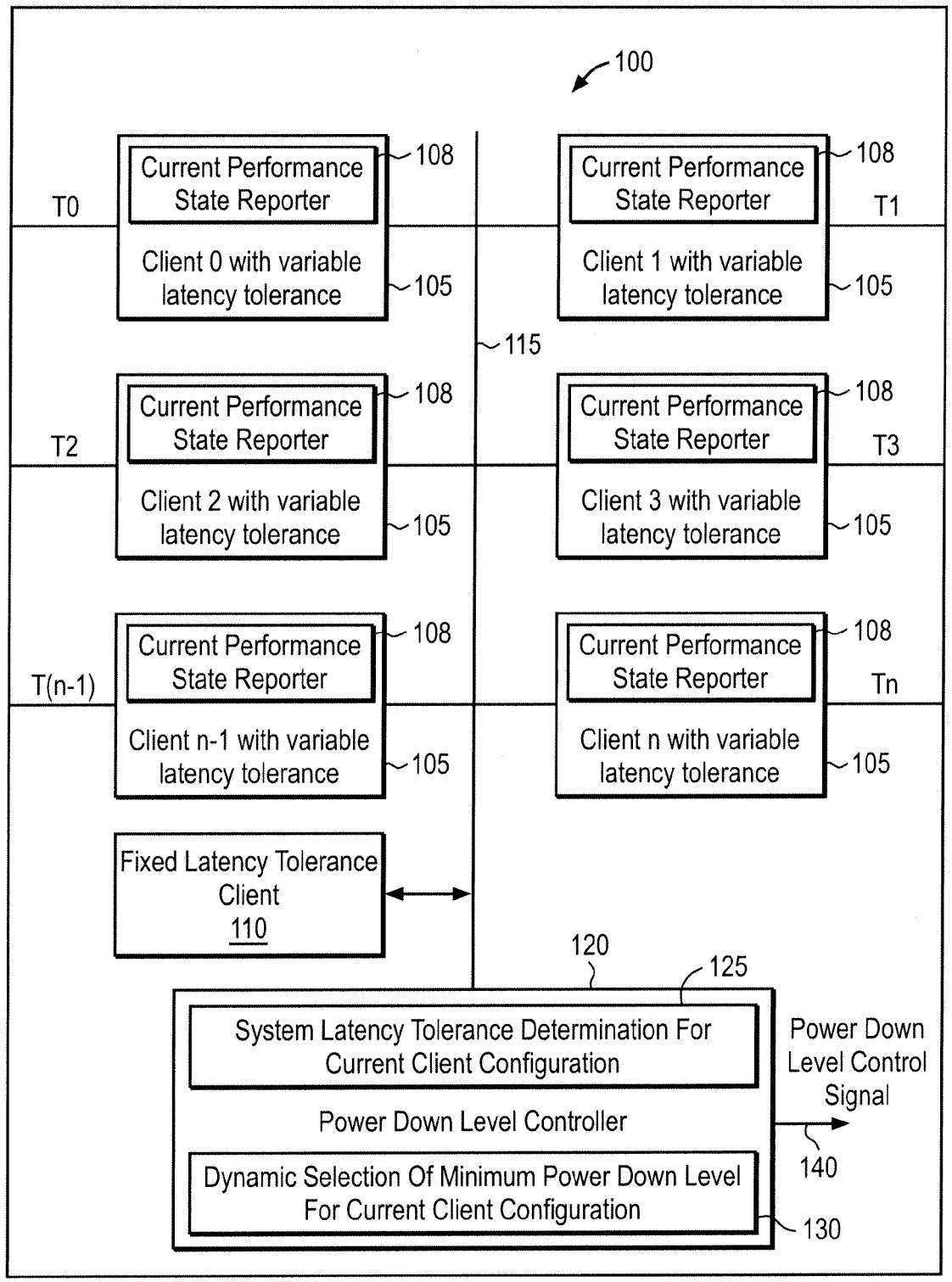
FIG. 1 illustrates a system for dynamic selection of power down level in accordance with one embodiment of the present invention.

FIG. 1 illustrates an exemplary apparatus 100 in accordance with one embodiment of the present invention. Apparatus 100 may, for example, be implemented as an integrated circuit for use with a central processing unit (not shown in FIG. 1) and a memory (not shown in FIG. 1). A plurality of clients 105 are included where each client 105 manages a function. An individual client 105 may, for example, be a data consumer that acts as an agent or bus master related to a specific functional block of an integrated circuit.

Apparatus 100 is designed for use with a system having a plurality of system performance levels including a normal operating level that is high performance/high power consumption performance level and a plurality of other performance levels corresponding to power down levels with reduced power consumption. These system performance levels may be described as an active state, and LPS1, LPS2, and LPS3 Low Power states, where the higher numbered LPS states have a lower power consumption and a higher latency. The higher number system states, such as LPS1, LPS2, and LPS3, typically correspond to off states with different power down levels and different system latencies. The deeper power down levels will generally have a higher exit latency to return to the normal operating level. In one embodiment there are at least two different power down levels although more generally there is an integer number, N, of power down levels.

In the most general case, there are an integer number of clients, such as client 0, client 1, ... client n. During the time period required to transition from a power down level to the normal operating level a client may be incapable of performing certain data processing operations, such as accessing a system memory (not shown in FIG. 1). Each client has a variable exit latency tolerance for transitioning out of a power down level and back to the normal operating level. As an illustrative example, the exit latency tolerance of an individual client may be associated with a memory latency tolerance for performing a memory access to the system memory (not shown in FIG. 1). Additionally, there may also be one or more clients 110 that have a fixed latency tolerance. In one embodiment, an individual client 105 has a pre-selected amount of buffering to buffer data for the client during transitions between performance levels.

The clients 105 are coupled to a communication backbone 115. Each client 105 includes a current performance state reporter 108 that generates a report on an internal operating state indicative of a current latency tolerance. The report may, for example, be generated as an interrupt whenever a change in internal state occurs.

A power down level controller 120 monitors reports received from each client 105 having a variable latency tolerance and dynamically balances the level of the power down based on current latency tolerance requirements. For example, logic 125 may determine a system latency tolerance for the current client configuration. Logic 130 may be included to make a dynamic selection of the deepest (minimum power consumption) power down level compatible with supporting the current client configuration. For example, logic 130 may include the exit latency for each different power down level and then make a selection of the deepest power down level capable of supporting the current system latency requirement. Power down level controller 120 may be implemented as hardware, a micro-controller managed by firmware, or other control entity known in the art.

In one embodiment, the reports generated by each state reporter 108 are simple on/off reports that indicate whether a client is in an active operating mode or in an inactive (off) mode. However, in one embodiment, at least one of the clients has two or more active states with different latency tolerances. For example, an individual client may manage different types of data traffic such that the internal operating state may include, for example, packet formats, connection speed, traffic classes, or other data traffic attributes that may affect a latency tolerance. As an illustrative example for an audio codec client the internal state may include packet parameters. For example, audio traffic may be simple low-bandwidth audio data or multi-channel high fidelity audio data. For a universal serial bus (USB) client, the internal state may include whether there is isochronous USB traffic. For a display client, the internal state may correspond to whether display data is for a conventional single display with a normal resolution or to a multi-screen high resolution display. For a network interface card client, the internal operating state may be the connection speed.

In one embodiment, power down level controller 120 generates a power down level control signal 140 to signal when changes in power down level are required. The power down level control signal 140 may, for example, be used to adjust the power down level of a central processing unit, bridge unit, or other integrated circuit. The present invention permits the power down level to be adjusted to the deepest possible level based on the current system exit latency requirements instead of the worst-case exit latency. As a result, the present invention permits significant power savings in applications in which the system is often in a "common case" having a higher latency tolerance than a "worst case" having a significantly lower latency tolerance. That is, when the system is in the common case a deeper power down level can be selected than for the worst case.

An exemplary application of apparatus 100 is as part of a chipset to support networking and communications functions between a central processing unit, memory, and other components of a computing system. For example, in one embodiment apparatus is included in media and communications processor (MCP) chip that replaces a conventional Southbridge chip and which supports integrated networking and communications functions such as supporting Ethernet ports, universal serial bus (USB) ports, and audio processing.

The present invention may be implemented as part of a system using different conventional CPU microprocessor chipset configurations. As is well known in the art, in some chipset architecture a Northbridge chip handles communication with the CPU and memory while a Southbridge chip handles I/O connections. However, a Northbridge chip and a Southbridge chip may be combined into a single-chip design as central hub. Additionally, while traditionally a Northbridge chip contains the memory controller some AMD processors, such as the K8 processor have the memory controller functionality integrated into the CPU. It will be understood that apparatus 100 of the present invention may be adapted for use with the different chipset architectures known in the art.

Figure 2:
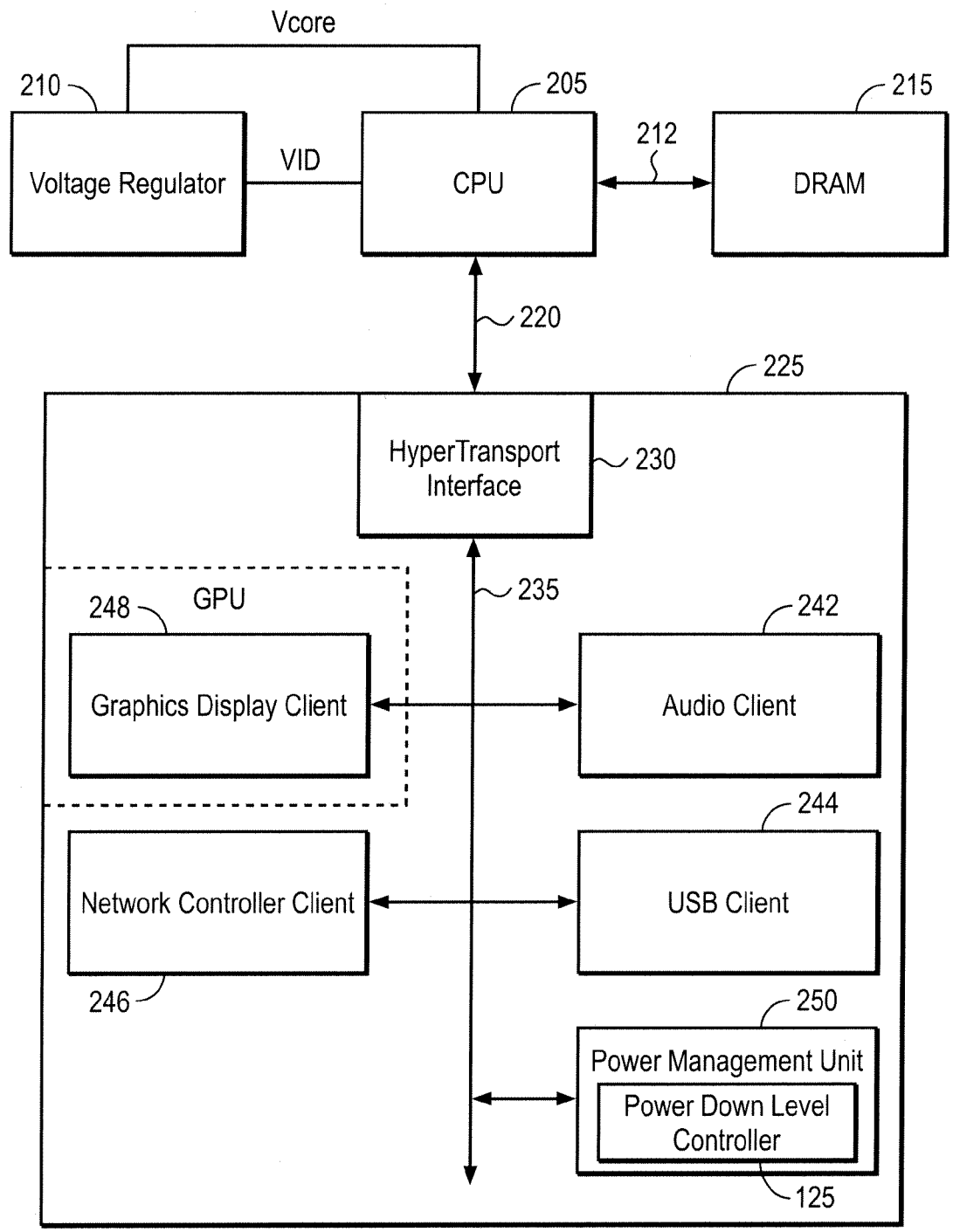
FIG. 2 illustrates a system for dynamic selection of power down level in accordance with one embodiment of the present invention.

FIG. 2 illustrates an exemplary system in accordance with one embodiment of the present invention. A central processing unit (CPU) 205 has an associated voltage regulator 210 that may be used to adjust its operating voltage using a voltage identification (VID) technique. A dynamic random access memory (DRAM) 215 is coupled to CPU 205 via a bus 212. As one example, CPU 205 may be implemented using an K8 AMD processor supporting an AMD alternate voltage identification (AltVID) function. AltVID is a deeper sleep mode in which the CPU voltage may be turned down to a lower level than in a conventional sleep mode. For example, in an AMD processor implementation, input/output circuitry may be disabled in low power states and clocks ramped down. AltVid is a technique using a 5-bit VID code applied to a voltage regulator to ramp the voltage further down after clocks have been ramped down. A hyper-transport (HT) link is established between integrated circuit 225 and CPU 205 via HT interface 230.

Integrated circuit 225 includes a plurality of clients 242, 244, 246, 248 each of which includes a state report (not shown) to send reports of the current performance state to power management unit 250. For example client 242 may be an audio client, client 244 a USB client, client 246 a network client, and client 248 a graphics display client associated with a graphics processing unit (GPU), with the GPU in one optional embodiment is integrated into integrated circuit 225.

Power management unit 250 includes a power down level controller 125 to select a power down level. In this example, power down level control signal 140 is coupled via backbone 235 and HT link 220 to CPU 205 to select the AltVID mode. The HT protocol defines interrupt mechanisms for communicating with an upstream unit, such as SMI interrupts. The power down level control signal 140 may thus be communicated with HT compatible interrupts, such as an SMI interrupt. The selection may be a simple on/off choice for the AltVID mode, i.e., either select a conventional power down level sleep mode or the lower voltage AltVID power down level sleep mode. In one implementation, the power down level controls signal 140 further defines the definition of the voltage settings used in the AltVID mode by the voltage regulator 210.

Figure 3:
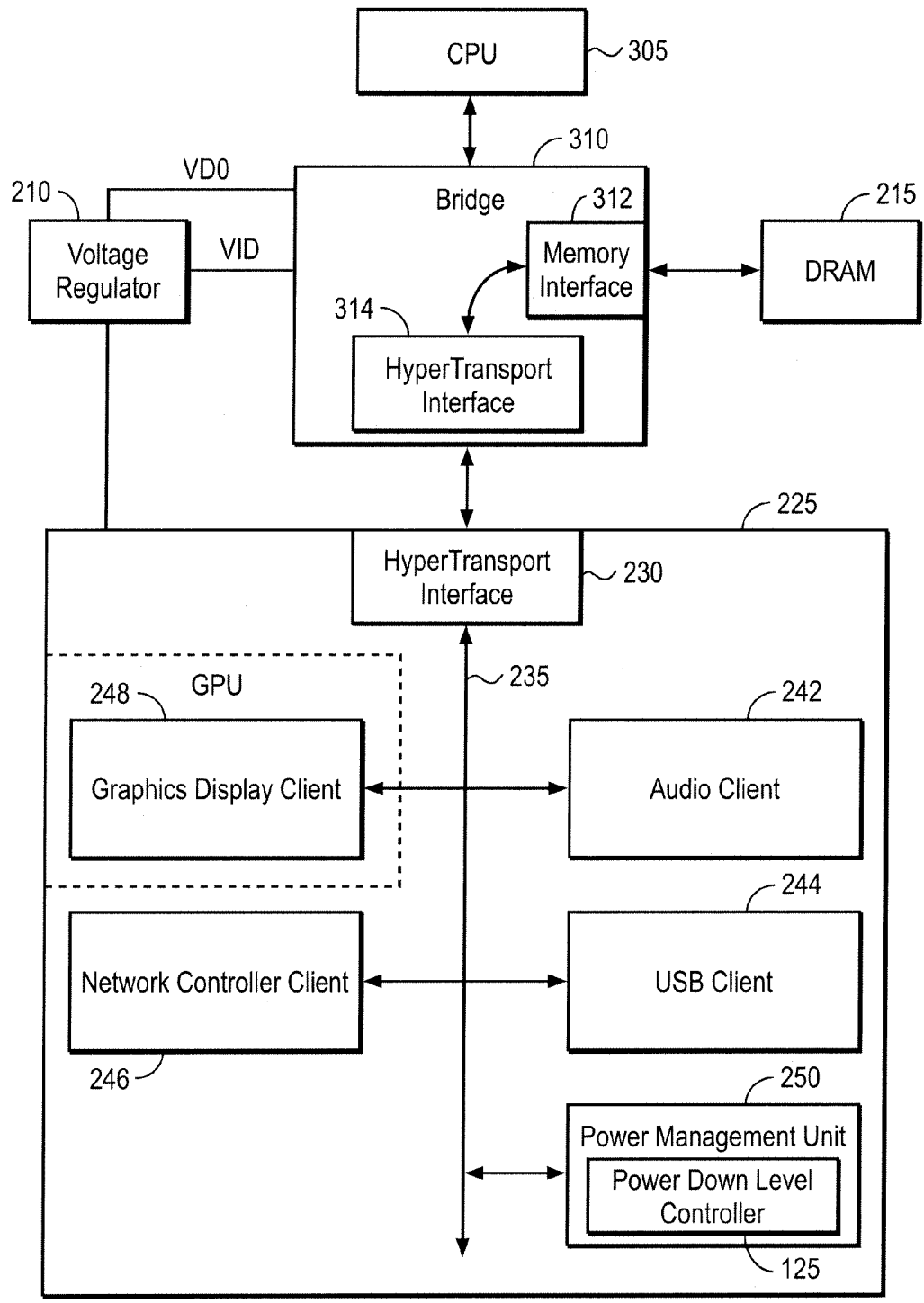
FIG. 3 illustrates a system for dynamic selection of power down level in accordance with one embodiment of the present invention.

FIG. 3 illustrates integrated circuit 225 is coupled to a North Bridge chip 310, having a HT interface 314 and a memory interface 312. DRAM 215 is coupled to bridge 310. In this example, the power down level control signal 140 is received by North Bridge chip 310 and used to adjust a voltage of a power down level of Northbridge chip 310

Figure 4:
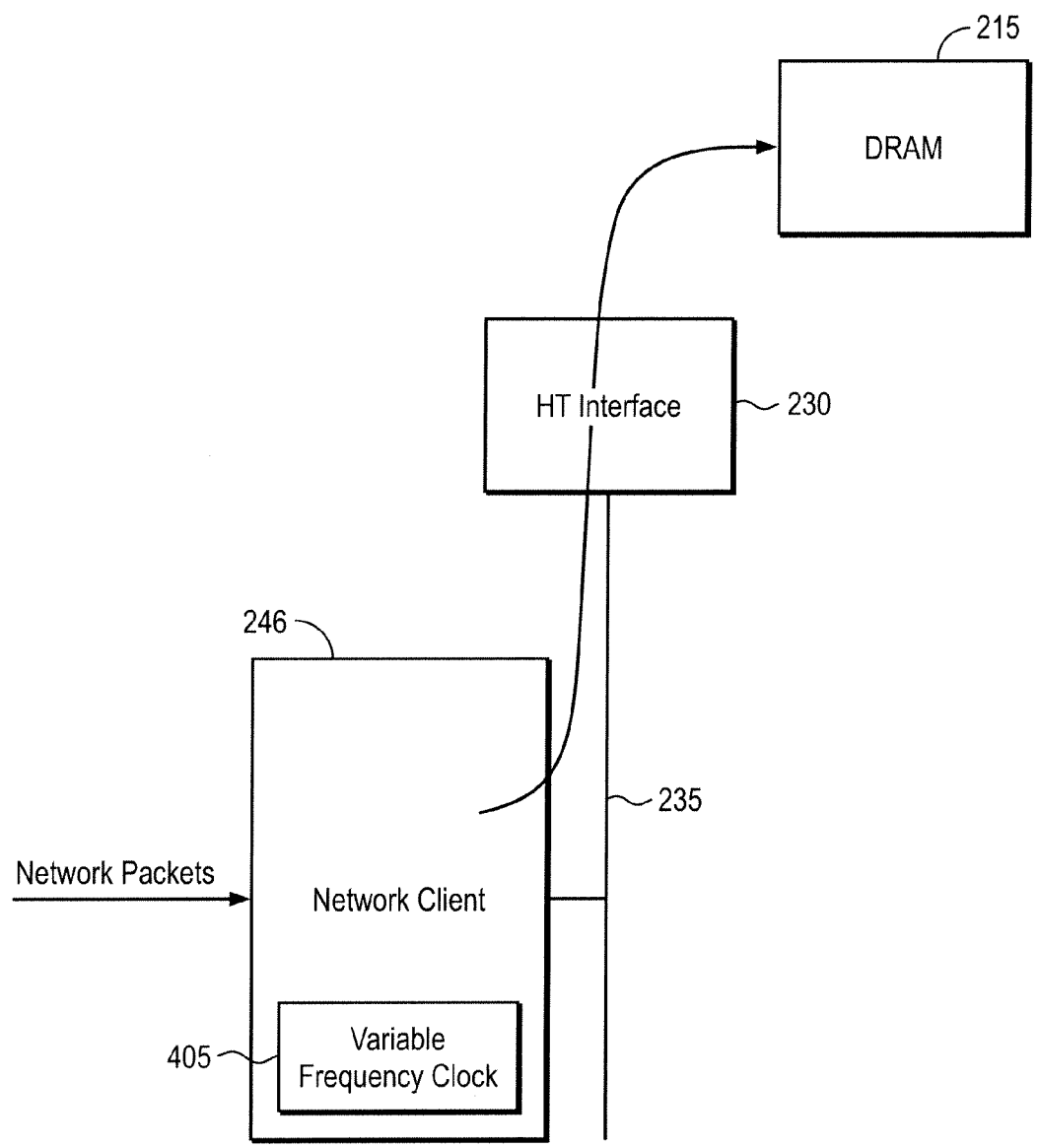
FIG. 4 illustrates an embodiment in which a power down level corresponds to an active state in accordance with one embodiment of the present invention.

In one embodiment, the power down levels correspond to different active states having different operating voltages, clock rates, or other attributes related to a reduced power consumption in an active state. For example, in one implementation, the power down levelscorrespond to reduced clock rates instead of to different off states. Referring to FIG. 4, in one embodiment a network controller client 246 has a variable clock rate unit 405 that permits its clock rate to be adjusted. In this embodiment, the operating frequency needs to be high enough to not lose packets before they can be read into memory 215 via interfaces that include backbone 235 and HT interface 230. Thus, for example, the clock rate may depend upon the network interface speed. For example, an Ethernet application may support network speeds of 10 Mbits/sec, 100 Mbits/sec, and 1000 Mbits/sec. In the lower speed modes the operating frequency of network controller client 246 may be turned down to save power. In this application, the latency is the memory access latency for placing data from data packets in memory 215 with the clock frequency selected to be a lowest frequency compatible with not losing data packets.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system having a plurality of power down levels with each power down level having an associated power level and exit latency, the system comprising:
  a plurality of clients dedicated to performing different functions, each client coupled to a communication backbone and each client having a latency tolerance that depends on a current performance state of the client, each client generating a report signal indicative of the current performance state to indicate the current latency tolerance associated with the client, where an individual performance state for a client includes an inactive mode and at least one active mode;
  a controller coupled to the communication backbone to select a power down level for said system, said controller monitoring report signals of said plurality of clients and selecting a power down level having a minimum power consumption capable of supporting a system latency for a current client configuration associated with said plurality of clients.

2. The system of claim 1, wherein said controller generates an instruction to a central processing unit to adjust a power down level of the central processing unit.

3. The system of claim 1, wherein said report signals indicate whether a client is active or inactive.

4. The system of claim 3, wherein at least one client has at least two different active performance states with different latency tolerances.

5. The system of claim 4, wherein said at least two performance states correspond to at least two different sets of communication traffic attributes.

6. The system of claim 5, wherein said at least one client is a network controller and said at least two performance states correspond to different network interface connection speeds.

7. The system of claim 5, wherein said at least one client is a Universal Serial Bus (USB) controller and said at least two performance states correspond to different types of USB traffic.

8. The system of claim 5, wherein said at least two performance states correspond to different packet parameters for data traffic handled by at least one of said clients.

9. The system of claim 1, wherein said controller selects between two power down levels.

10. The system of claim 9, wherein said two power down levels correspond to two different sets of voltage supply attributes for an integrated circuit in said system.

11. The system of claim 1, wherein said controller selects between an integer positive number N of power down levels, where N is greater than two.

12. The system of claim 1, wherein at least one power down level is an active state having a reduced operating frequency.

13. A method of managing power down levels with each power down level having an associated power level and exit latency, comprising:
  monitoring current latency tolerances of a plurality of clients associated with client performance states where an individual performance state for a client includes an inactive mode and at least one active mode; and
  dynamically selecting a power down level capable having a minimum power consumption compatible with a system latency associated with said plurality of clients for a current client configuration of the plurality of clients.

14. A system having a plurality of power down levels with each power down level having an associated power level and exit latency to return to a normal mode of operation, the system comprising:
  an integrated circuit, said integrated circuit including:
    an internal communications backbone interface;
    an interface for communicating with at least one other integrated circuit in a chipset to access a memory;
    a plurality of internal clients coupled to said backbone interface, each client performing a different function, managing a different type of data traffic and generating a report signal indicative of a current latency tolerance associated with a performance state of the client where an individual performance state for a client includes an inactive mode and at least one active mode;

a controller to select a power down level for said system, said controller monitoring report signals of said plurality of clients and generating an instruction to select a power down level having a minimum power consumption capable of supporting a system latency for a current client configuration associated with said plurality of clients.

15. The system of claim 14, wherein said controller generates an instruction to a central processing unit to adjust a power down level of the central processing unit.

16. The system of claim 14, wherein the memory is coupled to said integrated circuit by a Northbridge unit, said controller generating an instruction to adjust a power down level of the Northbridge unit.

17. The system of claim 14, wherein at least one power down level corresponds to an active state having a reduced operating frequency.

18. The system of claim 14, wherein at least one power down level corresponds a sleep mode and another power down level corresponds to a deeper sleep state having a reduced operating voltage.

19. The system of claim 14, wherein said performance states include an active state and an inactive state.

20. The system of claim 19, wherein at least one client has at least two different active performance states with different latency tolerances.

* * * * *